United States Patent [19]

Ruggieri et al.

[11] 4,365,590
[45] Dec. 28, 1982

[54] VENTILATED ANIMAL CAGE RACK

[75] Inventors: Albert P. Ruggieri, Flourtown, Pa.; Frank J. Marinaccio, Ridgewood; Neil E. Campbell, Hasbrouck Heights, both of N.J.; Wayne Allen, Hatboro, Pa.; Stanley Moum, Westfield; Paul F. Malatesta, Somerset; Joseph J. Pietrowski, Linden; Leonard H. Schwartz, North Brunswick, all of N.J.

[73] Assignee: Lab Products, Inc., Maywood, N.J.

[21] Appl. No.: 284,707

[22] Filed: Jul. 20, 1981

[51] Int. Cl.³ .............................................. A01K 1/03
[52] U.S. Cl. ..................................... 119/15; 119/17
[58] Field of Search ..................... 119/15, 17, 18, 19, 119/21, 31, 34; 312/322, 323

[56] References Cited

U.S. PATENT DOCUMENTS

| | | | |
|---|---|---|---|
| 1,823,584 | 9/1931 | Bruce | 119/31 |
| 2,335,173 | 11/1943 | Corey | 119/21 |
| 3,924,571 | 12/1975 | Holman | 119/15 |
| 4,085,705 | 4/1978 | Gland et al. | 119/17 |
| 4,305,347 | 12/1981 | Hemenway et al. | 119/15 |

FOREIGN PATENT DOCUMENTS 391892  5/1933  United Kingdom ................ 312/322

*Primary Examiner*—Hugh R. Chamblee
*Attorney, Agent, or Firm*—Edward F. Levy

[57] ABSTRACT

A ventilated animal cage rack has a hollow housing divided into a plurality of horizontally-disposed shelf compartments separated from each other by partition walls and having front open ends normally closed off by transparent doors which isolate the interiors of the shelf compartments from each other and from the interior of the room containing the cage rack. Each shelf compartment is sized to contain a row of horizontally-spaced animal cages having open top ends and closed bottom ends, with the open top ends spaced well below the ceiling of the shelf compartment. A low pressure air plenum extends vertically along one side of the cage rack and communicates with one side of each of said shelf compartments, the other sides of which contain air inlet openings communicating with the room interior, thereby providing a low-pressure negative air flow along the top open ends of the contained animal cages to said air plenum and then to a room exhaust system. The animal cage rack is provided with a watering system including an individual water dispensing valve for each of the contained animal cages, and each cage is provided with an access opening through which the animals therein may reach the respective dispensing valve. Each shelf is provided with a guide member for each animal cage stored therein, each guide member being precision formed to insure accurate registry of the access opening of the inserted animal cage with the respective water dispensing valve.

19 Claims, 8 Drawing Figures

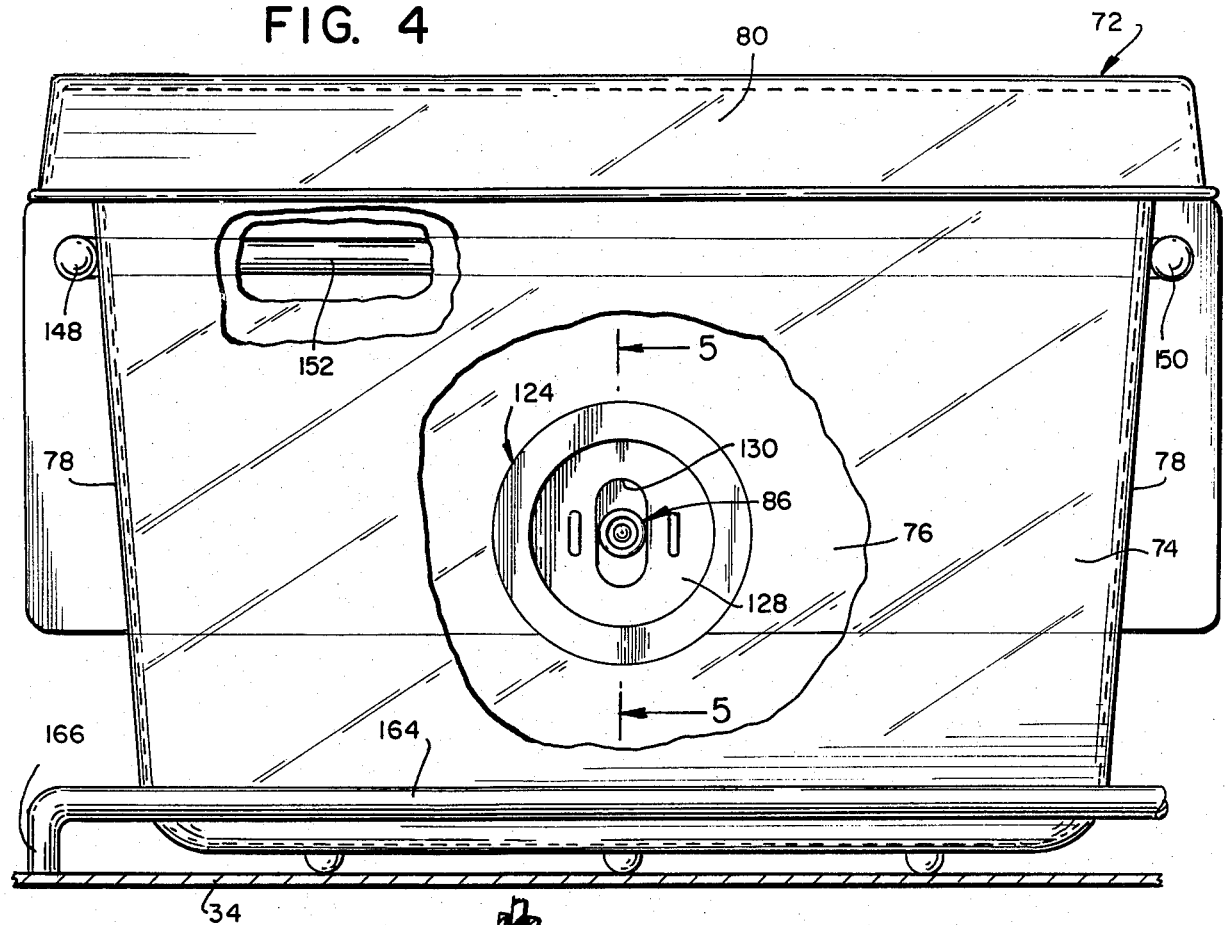
FIG. 4
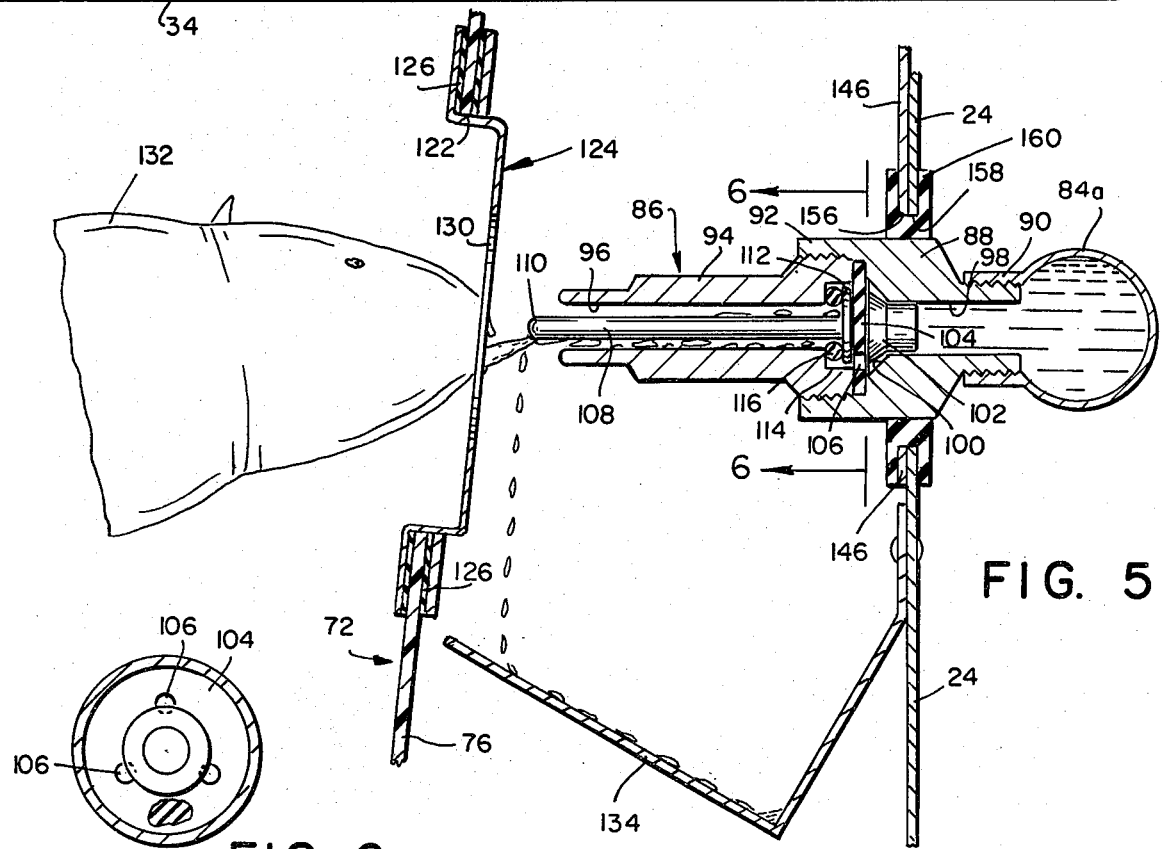
FIG. 5
FIG. 6

VENTILATED ANIMAL CAGE RACK

The present invention relates to a novel and improved cage rack for housing experimental animals, and in particular to a ventilated animal cage rack system which is effective in isolating the interior of the cage rack from the surrounding atmosphere.

In laboratory experimental procedures, it is common practice to house individual experimental animals, particularly small rodents such as mice and rats, in individual cages containing watering and feeding facilities. The cages may be made of open wire mesh or may be made of the shoe-box type, having solid transparent plastic walls. For convenience, the cages are usually mounted in close side-by-side relationship upon racks, so that in one small area a large series of cages containing individual animals may be mounted. Such concentration of cages and animals in close proximity has presented problems in the conducting of experiments and maintenance of the animals, since infectious disease tends to spread readily between the closely-confined animals and the animals are subject to induced stress from surrounding noises, drafts and temperature changes, making them more susceptible to disease. A particularly pressing problem is the exposure of laboratory workers to contaminated air and strong animal odors when the cages must be handled for feeding and watering of the animals, as well as cleaning. Many laboratory personnel are allergic to laboratory animals, and additional personnel become allergic with continued exposure to these research animals. The presence of allergens, animal dander, pheromones and infectious aerosols in the air of the room containing the cages, has produced allergic reactions in personnel to such an extent that many qualified technicians have been unable to continue their work in experimental research.

Attempts have been made to solve these problems by providing ventilated cage-storing systems which separate the laboratory animals from the laboratory personnel in the course of the latter's routine work. Initially, animal cages were stored in closed rooms having ventilated ceilings with an air flow from the top to the bottom of the room, which was effective in continually removing dust carrying animal dander and other allergens. This did not afford to the cages the required mobility, and it required expensive room construction and complex ventilating systems.

The ventilation principal was then applied to animal cage racks in which cages are suspended from shelves and a unidirectional flow of air is induced in each cage by connecting the cages to an air exhaust system. This required each cage to have a direct coupling to the exhaust system, limited the sizes of the cages which could be used, and made removal and handling of cages difficult. An example of a ventilated animal cage rack of this type is shown in U.S. Pat. No. 4,085,705 in which the cage rack is mounted on wheels and is portable. The animal cages are suspended on open shelves, each of which is hollow and serves as a branch air duct. Each hollow shelf is connected to a main air duct coupled to an existing air exhaust source, and each hollow shelf has a hole communicating with the upper end of each shelf suspended thereon. The ducts exhaust air from each of the suspended cages through the open top ends thereof, and cause a non-turbulent flow of air upwardly through the cages. In order to create this vertical airflow upwardly through the interiors of the animal cages, it is necessary that the cages be of the type having open grill bottoms, and solid bottom cages cannot be used in the system. In addition, since the upward air flow created by the negative pressure of the ducts draws room air into the bottom open ends of the cages, it is necessary that the animal cage rack have open ends and sides, so that animal odors are not effectively eliminated.

It is an object of the present invention to provide a portable ventilated animal cage rack in which solid bottom plastic cages are individually rested on shelves or suspended in rows within horizontal shelf compartments and a low velocity negative air flow is induced through each of the shelf compartments and thence to an external exhaust source, thereby ventilating each shelf compartment indivi dually.

Another object of the invention is the provision of a portable ventilated animal cage rack of the type described in which the interior of the rack is completely enclosed by sliding doors which may be individually opened and slid up to a retracted position to provide access to the animal cages within the respective shelf compartments. The door system effectively isolates the animals from the room environment in which the laboratory personnel work, eliminating animal odors and protecting the laboratory personnel against allergens, animal dander and the like which may otherwise enter the room environment. The doors are provided with locks which prevent accidental opening, but which may be easily unlocked without the use of tools or keys.

Another object of the invention is the provision of a cage rack system of the character described which is provided with an automatic watering assembly for each of the cages, by means of which the animals may obtain drinking water when needed. Each of the cages is provided with a grommeted opening aligned with the respective dispensing nozzle.

Still another object of the invention is the provision of a cage rack system of the character described in which the air flow through each shelf compartment may be selectively regulated in a rapid and convenient manner by means of sliding gates which may be raised or lowered. Safety means are provided on the gates to prevent them from being fully shut, thereby insuring that an air flow of some degree will always be maintained within the compartment.

A further object of the invention is the provision of a cage rack system of the character described in which the provision of a low velocity negative air flow within each of the compartments containing the animal cages, and the complete enclosure of each compartment by the sliding door, shelters the laboratory animals in an environment which is free of drafts, abrupt temperature fluctuations, and outside noises caused by activities of laboratory personnel. The animals are subjected to reduced stress, resulting in improved breeding and litter survival, gain in body weight, and greatly reduced susceptibility to infectious deseases.

In accordance with the invention, there is provided a ventilated animal cage rack comprising an open front housing having partition walls dividing it into a plurality of horizontally-disposed shelf compartments, each sized to house a plurality of animal cages having open tops. A plurality of hinged sliding doors close off the open front of the housing and in closed condition maintain the shelf compartments sealed off from each other. A plenum, at one side of the housing and extending vertically therealong, is connected to suction means drawing air from the plenum and directing it to an exhaust system. The plenum communicates with one end of each shelf compartment, the other end of which has an air inlet opening communicating with the room interior and covered by a dust filter. The animal cages are mounted in rows in each shelf compartment with their top open ends well spaced from the ceiling of the compartment. The suction means and air pressure provide a unidirectional, low-velocity, negative air flow through each shelf compartment along the top open ends of the animal cages therein, thereby ventilating each shelf compartment individually and isolating the shelf compartments from each other and from the atmosphere of the surrounding room.

The cage rack is also provided with an automatic watering system comprising a water circulation manifold mounted on the rear wall of the housing and communicating with individual water dispensing valves aligned with each of the animal cages within each shelf compartment, and facing the rear walls of the cages. The cage rear walls are each provided with a small opening through which the animals in the cage have access to the aligned dispensing valves. Guide means are provided for precisely positioning each of the cages with its rear access opening in exact registry with the aligned dispensing valve.

Additional objects and advantages of the invention will become apparent during the course of the following specification when taken in connection with the accompanying drawings, in which:

FIG. 4 is an enlarged end elevational view showing the animal cage of FIG. 3 mounted within the cage rack, with portions of the cage broken away;

FIG. 5 is an enlarged sectional view taken along line 5—5 of FIG. 4, showing details of the dispensing nozzle of the watering system and the manner in which a laboratory animal obtains drinking water therefrom;

FIG. 6 is a section taken along line 6—6 of FIG. 5;

Figure 1:
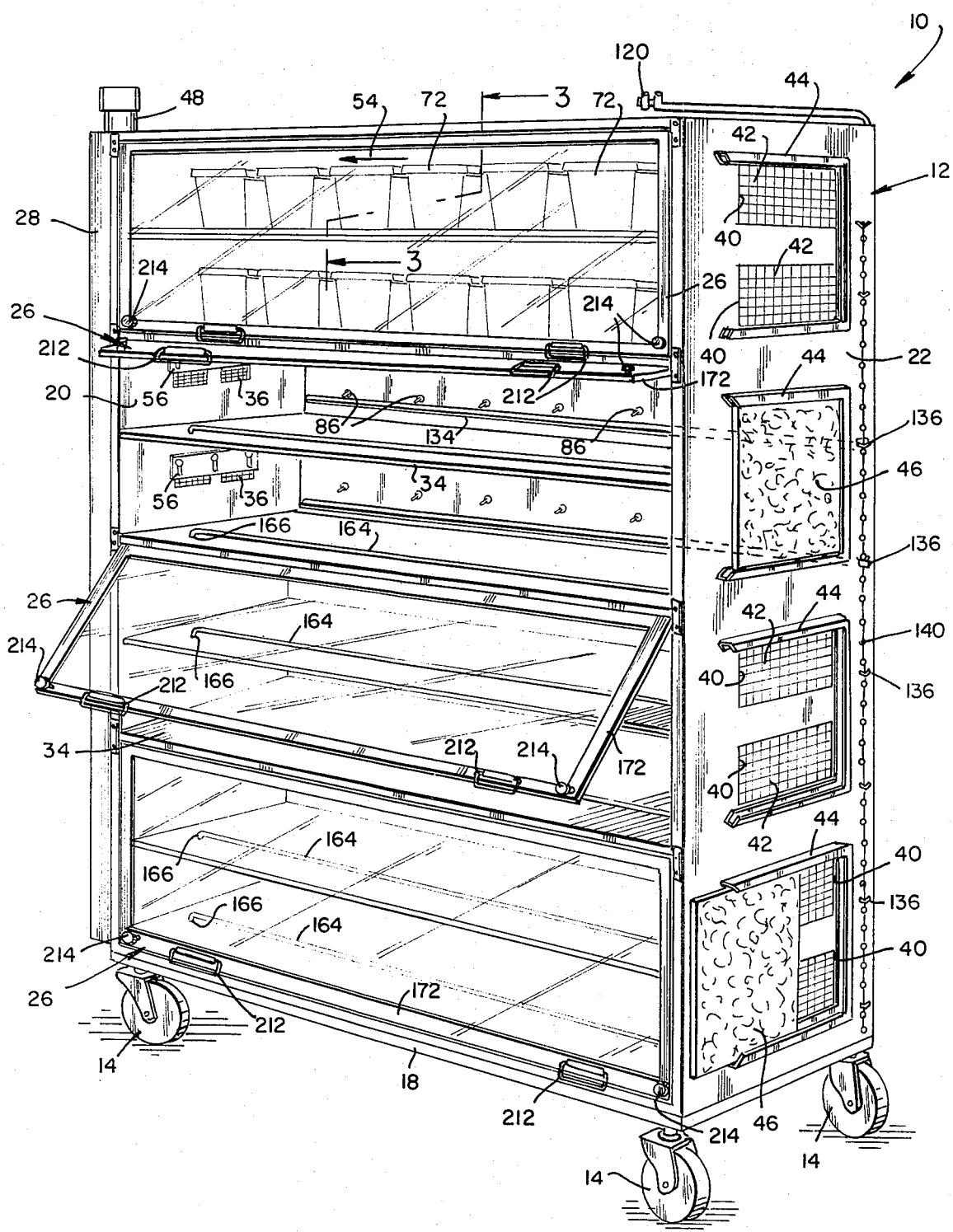
FIG. 1 is a front perspective view of a ventilated animal cage rack made in accordance with the present invention and showing one compartment door fully open and one in partially-open condition.
Figure 2:
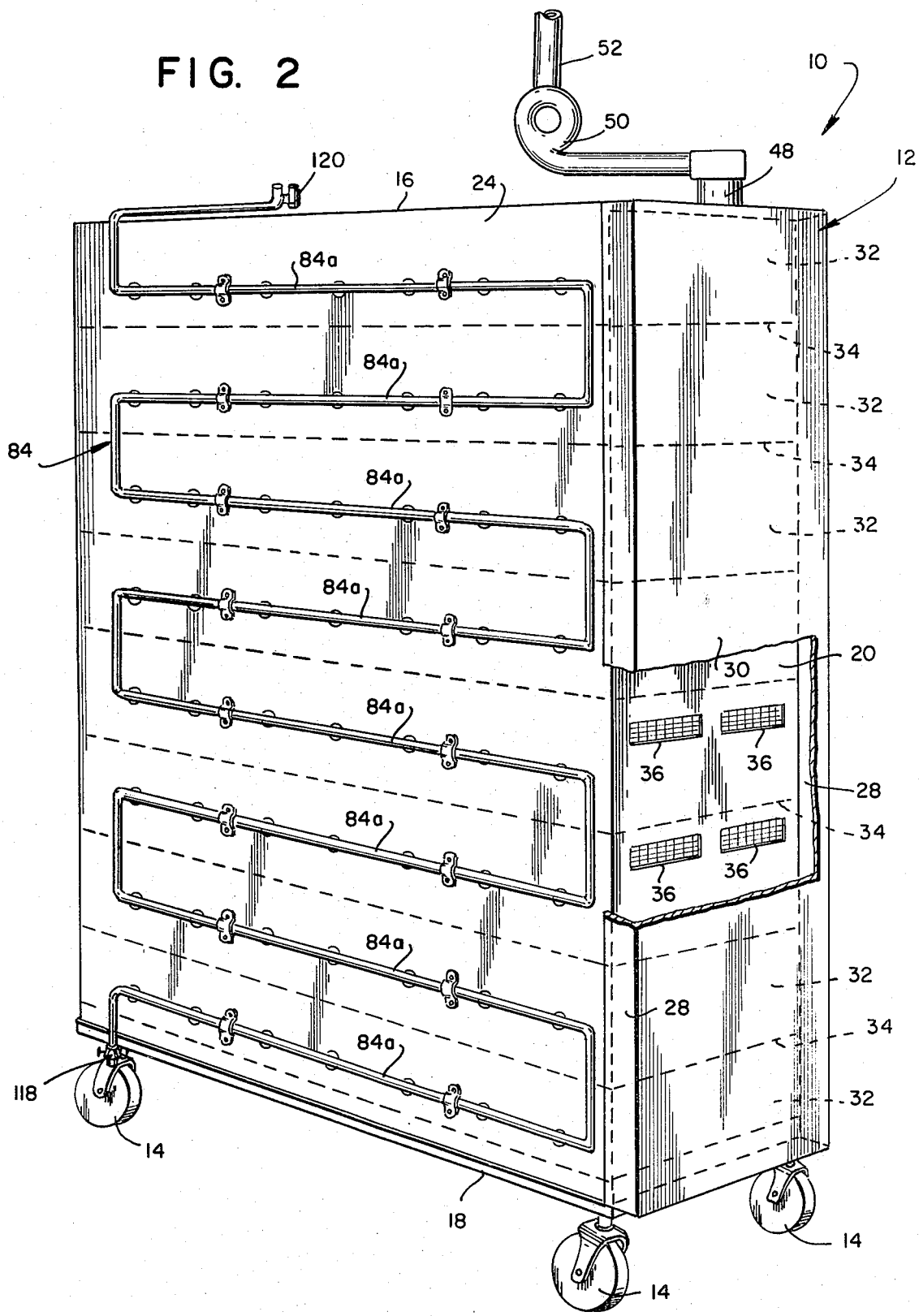
FIG. 2 is a rear respective view thereof, with portions of the outer side wall broken away to reveal inner constructional detail.

Referring in detail to the drawings, there is shown in FIGS. 1 and 2 portable ventilated animal cage rack 10 made in accordance with the present invention and comprising a cabinet or housing 12 mounted on wheels or casters 14. The housing 12 is made of sheet metal, preferably stainless steel, with a top wall 16, bottom wall 18, side walls 20 and 22, rear wall 24 and an open front covered by transparent doors 26. The side wall 20 is connected by short extension walls 28 to an outer side wall 30 which is spaced therefrom, as shown best in FIG. 2, to provide an air plenum chamber between said walls, in a manner to be presently described.

The interior of the housing 12 is divided into eight horizontal shelf compartments 32 by flat spaced partition walls 34 which extend horizontally between the side walls 20 and 22 and from the rear wall 24 to the open front of the cage rack. The partition walls 34 are secured at their edges to the abutting walls and effectively seal off the horizontal compartments 32 from each other.

The inner side wall 20 is provided with a plurality of elongated, rectangular air outlet openings 36 which are arranged in pairs of horizontally-aligned outlet openings, each pair registering and communicating with a respective shelf compartment 32, as shown in FIG. 2. Each opening 36 is covered by a metal grill 38. At the opposite side of the animal cage rack, the side wall 22 is formed with a plurality of air inlet openings 40, each being of rectangular shape and each communicating with a respective shelf compartment 32. Each inlet opening 40 is covered by a metal grill 42. The inlet openings 40 are arranged in pairs of vertically-spaced openings, as shown in FIG. 1, and each pair is bordered by a channel frame 44 of inverted C-shape into which a dust filter 46 may be slid and removably retained. In FIG. 1, a dust filter 46 is shown partially inserted in the lowermost channel frame 44, and another dust filter 46 is shown fully inserted in the second channel frame 44 from the top of the cage rack. The filters 46 are of the usual panel type, formed of fibre glass, plastic wool or the like.

The air plenum, formed between the inner and outer side walls 20, 30, communicates through the top wall 16 with a pipe joint 48 which is connected to the inlet end of an electrically-driven air blower 50 which serves as a suction source (FIG. 2). The outlet end of the air blower 50 is connected by conduit 52 to the air exhaust system (not shown) of the building. When the cage rack 10 is wheeled to a desired location and the blower 50 operated, the latter draws air upwardly through and out of the air plenum and through each of the rectangular outlet openings 36 from the interior of the cage rack. This induces a low velocity negative air flow through each of the shelf compartments 32, the air entering the cage rack interior through the filters 46 and inlet openings 40, passing in a low velocity unidirectional flow over the open tops of the contained animal cages, in the direction of the arrow 54 in FIG. 1, then passing through outlet openings 36 into the interior of the plenum between inner and outer side walls 20, 30. From the plenum, the air is sucked through blower 50 and forced out through the room exhaust system. Alternatively, the plenum may be connected directly to an existing suction exhaust system of a building.

Figure 3:
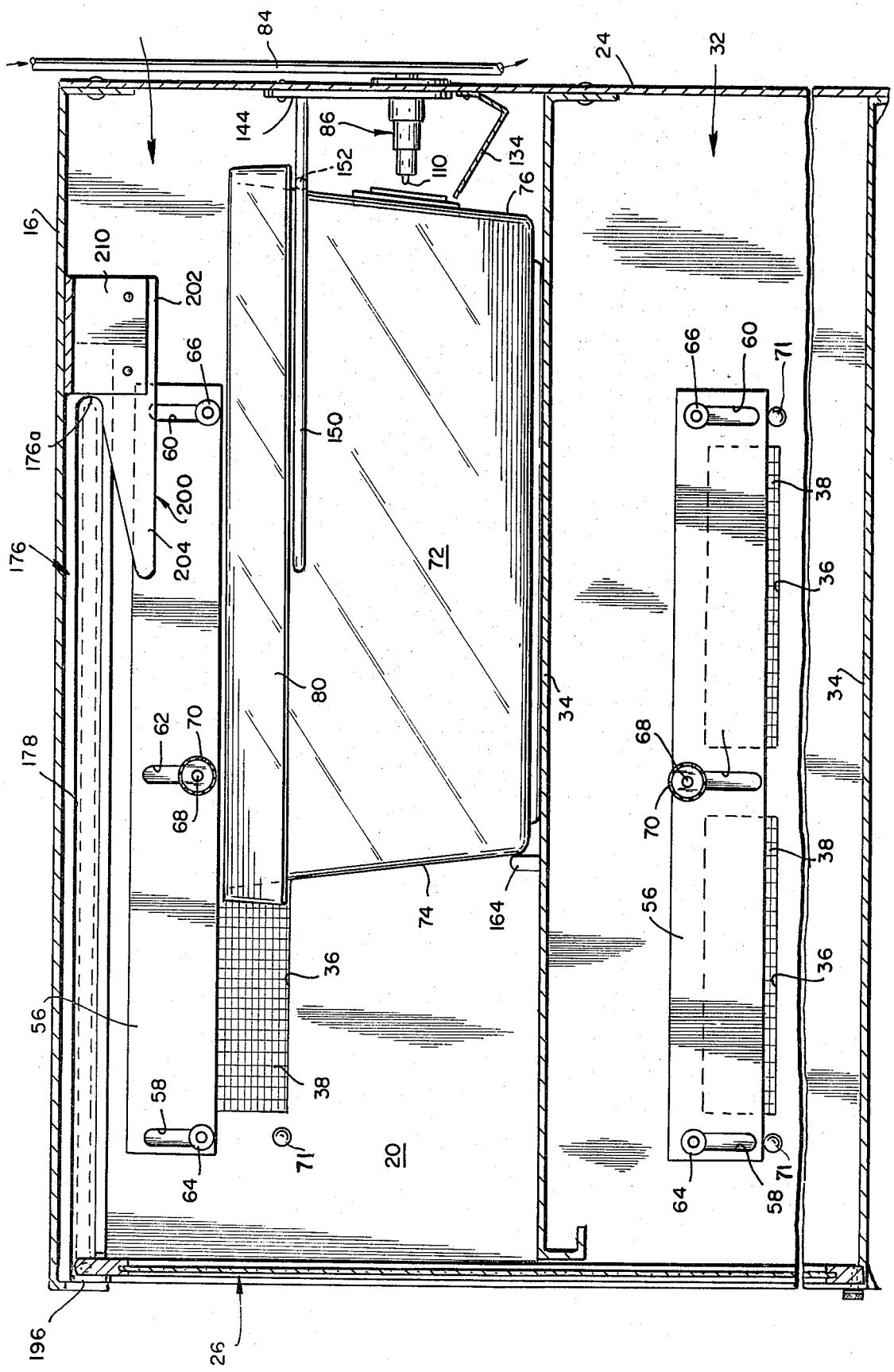
FIG. 3 is an enlarged sectional view taken along line 3—3 of FIG. 1.

For purposes of selectively regulating the degree of air flow through the shelf compartments 32, adjustable gates 56 are slidably mounted inwardly of and proximate to each pair of air outlet openings 36 in each compartment. Each gate 56 consists of a rectangular metal plate sized to cover over the associated pair of outlet openings 36. As shown in FIG. 3, each gate 56 is formed with an elongated vertical slot 58, 60 at its opposite ends and a central elongated vertical slot 62 at its center. Respective rivet-shaped studs 64 and 66, secured to and projecting from the inner surface of inner side wall 20, extend through the end slots 58, 60 and mount the gates 56 upon side wall 20 for vertical sliding movement between an elevated position and a lowered position. In addition, a threaded post 68, secured to and projecting from the inner side wall 20, extends freely through the central slot 62. A knurled circular nut 70 is threadedly mounted on the post 68 so that it may be tightened to lock the gate 56 in any selected elevated position.

At the upper portion of FIG. 3 the gate 56 is shown in a fully-elevated position in which the studs 64, 66 and the pin 68 are located at the bottom ends of slots 58, 60 and 62, and the gate is located well above the tops of outlet openings 36, the latter being completely unblocked for passage of air therethrough. On the other hand, the gate 56 shown at the lower portion of FIG. 3 is in a fully-lowered position, with the studs 64, 66 and the pin 68 located at the lower ends of slots 58, 60 and 62. In this fully lowered position, the outlet openings 36 are almost completely covered over by the gate 56 so that the flow of air therethrough is greatly reduced. The gates in different shelf compartments may be individually adjusted to various positions between the fully-elevated and fully-lowered positions. In this manner, the velocity of air flow through each shelf compartment may be selectively regulated in accordance with the needs and conditions of the laboratory animals housed in the particular shelf compartments.

As shown in FIG. 3, a pair of stop pins 71 are mounted on the inner side wall 20 adjacent the lower ends of outlet openings 36 in a position to be engaged by gate 56 in the lowermost position of the latter. The pins 71 thus stop downward movement of the gate while the outlet openings 36 are still partially uncovered. The stop pins 71 therefore provide a safety feature preventing the outlet apertures from being completely covered over so as to shut off the flow of air entirely through the respective shelf compartment. If the gates were capable of completely covering over the outlet apertures and moved to such position by inadvertent setting, or by accidentally falling, the blocked outlet apertures would shut off any flow of air through the respective shelf compartment and the animals housed therein would be smothered or otherwise adversely affected. The aforementioned safety feature insures that there is always at least a minimal flow of fresh ventilating air through each compartment.

The animal cage rack 10 is adapted to house a large number of animal cages 72 arranged in horizontal rows of closely-spaced cages, each row being housed within a respective shelf compartment. The commercial embodiment of the cage rack shown in FIG. 1 is sized, for example, to house a row of seven cages in each of its eight shelf compartments. Each of the cages 72 is a solid bottom plastic cage, preferably polycarbonate, which may be transparent or translucent. Such cages are commercially available and are widely used in conventional cage racks. Closed bottom cages of this type could not be utilized in the ventilated rack systems heretofore provided since the systems operated on the principle of directing a flow of air in a vertical direction individually through each cage, so that cages with grill-covered open bottoms were required. The animal cage rack 10 is capable of mounting open-bottom cages, but is also uniquely capable of utilizing the readily available closed bottom cages because of its ability to direct a flow of air horizontally through each of the shelf compartments and over the open tops of the mounted cages, in a manner to be presently described.

Each cage 72 has downwardly-tapered front and rear walls 74 and 76, and side walls 78 which taper inwardly toward each other from top to bottom. At its top, the cage 72 is bordered by a peripheral flange 80 which is conventionally used for suspending the cage from a shelf support. In conventional racks, the horizontal partition walls forming the shelves are provided with depending bracket forming tracks onto which the cage top flanges are slid for mounting the cage suspended from the shelf ceilings. This locates the tops of the cages close to the shelf ceilings. In the cage rack 10 of the present invention, the cages are not suspended from the overlying shelf partitions, but rather rest upon the underlying shelf floors, being guided, upon insertion, into an accurately aligned position by positive cage alignment means. Such alignment is essential where the cage rack is provided with an automatic watering system now to be described.

Because of its novel manner of ventilation, the cage rack 10 is capable of incorporating an automatic watering system, shown in FIGS. 2, 4 and 6, and made entirely of stainless steel for accurate alignment purposes. The watering system includes a manifold in the nature of a serpentine pipe 84 secured to the outer surface of the housing rear wall 24 as shown in FIG. 2. The pipe 84 is formed with spaced horizontal sections 84a, each of which registers with a respective shelf compartment 32. Secured to each of the pipe horizontal sections 84a and communicating therewith are a plurality of water-dispensing valves 86 which extend through the housing rear wall and project into the interior of said housing. A valve 86 is provided for each animal cage 72 to be inserted into the cage rack housing, and means are provided to insure accurate registry of each cage with a respective valve, as will be presently described.

One of the dispensing valves 86 is illustrated in detail in FIG. 5 and comprises a valve body portion 88 threadedly secured to an outlet extension 90 of pipe section 84a. The body portion 88 has an internally-threaded cup-shaped open end 92 within which is threadedly mounted a nozzle portion 94 having an axial bore 96. The body portion 88 also has a central longitudinal bore 98 communicating with a recess 100 in which is seated a plastic stud 102. Abutting the stud 102 is a disc 104 made of resilient and elastomeric material, such as soft foam plastic, and having a plurality of apertures 106 formed therein. Extending freely through the nozzle bore 96 is an elongated rod 108 having a rounded tip 110 projecting from the mouth of nozzle portion 94 and terminating at its opposite end in a circular plate 112. The nozzle portion 94 is formed with a well 114 of circular cross-section defining a valve seat, and the circular plate 112 is located within this well 114 in engagement with an annular gasket 116 which is seated within said well.

When the valve 86 is not in use, the water in pipe section 84 applies pressure against the stud 102, urging it inwardly through bore 98 into contact with the center of disc 104, thereby allowing water to flow out of bore 98 and through the apertures 106 of disc 104. The circular plate 112 abuts the center of disc 104 and is urged by the resilient disc against the gasket 116 with a light pressure, but sufficient to form a water-tight seal therebetween, so that water will not normally pass through the nozzle bore 96. It will be noted in FIG. 5 that the bore 98 is of appreciably greater diameter than the rod 108. In the sealing position of the circular plate 112, the latter is biased flush against the gasket 116, so that the rod 108 extends centrally through the bore 98 and is spaced from the wall thereof around its circumference.

Each animal cage is stored adjacent to one of the dispensing valves 86 in such a manner that the laboratory animal has access to the valve nozzle through an aperture in the cage. When the animal seeks to drink, it engages the mouth of nozzle portion 94 with its snout, and locks the projecting rounded tip 110 of rod 108 with its tongue in the manner indicated in FIG. 5. Transverse wiping movement upon the tip 110 causes the rod 108 to tilt within bore 96, which in turn causes the circular plate 112 to tilt slightly relative to gasket 116 and to break the seal therewith to a small degree, but sufficiently to allow a small amount of water to flow through the bore 96 and along the surface of rod 108 where it is dispensed in the form of droplets upon the tongue of the animal. This dispensing of water droplets continues as long as the animal licks the rod tip 110.

The water pipe 84 has a bottom inlet end 118 adapted to be connected an external source of water (not shown) so that the water flows in an upward direction through the pipe 84. The top end of pipe 84 is normally closed by a manually-operable valve 120. This construction provides a flush system by means of which the pipe section 84a may be flushed on a daily basis to control cross-contamination in the drinking water. To flush the system, the valve 120 is opened and water is allowed to flow freely through pipe 84 to a drain.

Each cage 72 is provided with an access aperture 122 through which the animal may obtain access to the adjacent water dispensing valve 86. The access aperture 122 is centrally located in the cage rear wall 76 and a stainless steel insert 124 is secured and sealed thereto by means of a gasket 126. The insert 124 has a depressed front wall 128 located exteriorly of the cage rear wall 76, as shown in FIG. 5. Centrally located in the insert front wall 128 is an elongated opening 130 having rounded ends (FIG. 6). The opening 130 is sized to permit the animal to insert its snout therethrough, but is small enough to prevent the animal from escaping from the cage therethrough. As will be presently described in detail, each cage 72 is guided to be inserted into the cage rack in a precise position in which the insert 124 in its rear wall 76 is closely spaced from and aligned with the mouth of a water dispensing valve 86. FIGS. 4 and 5 show a cage 76 inserted in such precise position, and FIG. 5 shows the manner in which a laboratory animal 132 inserts its snout through the elongated insert opening 130 and engages the tip 110 of the adjacent valve rod 108 in order to obtain drinking water. It will be seen that by such arrangement, any excess water dripping from the mouth of valve 86 falls outside of the cage 72 and not into the interior thereof. To collect such excess dripping water, a V-shaped trough 134 is secured to the rear wall 24 of the cage rack underlying the row of water dispensing valves 86 in each of the horizontal shelf compartments 32, as shown in FIGS. 1,3,5 and 7. Each of the troughs 134 is slightly inclined so that the collected water will flow therethrough from left to right, as viewed in FIG. 1, to a small extension 136 (FIG. 7) which extends through a small opening in the cage rack side wall 22 and projects outwardly therefrom. Each extension has an aperture 138, and a beaded chain 140 extends vertically through the apertures 138 of all of the aligned trough extensions 136, terminating below the bottom wall 18 of the cage rack. A waste receptacle (not shown) may be placed below the bottom end of the chain to collect the waste water gathered on the chain and guided therealong.

Figure 7:
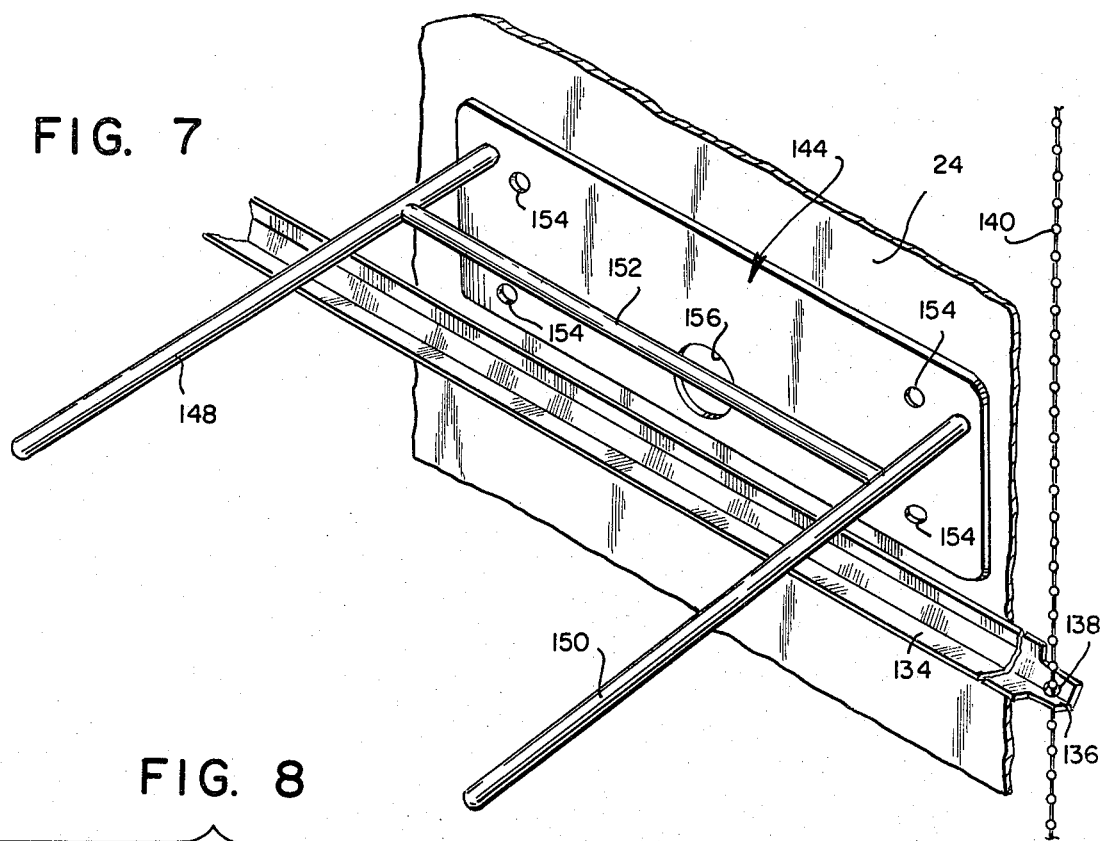
FIG. 7 is an enlarged perspective view of one of the cage mounting and guiding brackets of the rack showing the relative location of the drainage trough of the watering system.

In order for the caged laboratory animals to have proper access to drinking water provided by the dispensing valves 86, it is imperative that each of the cages 72 be accurately positioned within the cage rack so that the access opening 130 in its rear insert 124 is precisely aligned with the mouth of one of the dispensing valves and is precisely spaced therefrom. For this purpose, guide means are provided for each of the animal cages to insure that the cage upon insertion is maintained in a precise position. The guide means includes a guide bracket 144, shown in FIGS. 3, 4 and 7, comprising a rectangular plate 146 from which projects a pair of spaced elongated cylindrical rods or bars 148, 150, interconnected by a cross-bar 152. As shown in FIG. 7, the plate 146 is drilled with four locator holes 154 for precision mounting thereof on the cage rack rear wall 24. Plate 146 is also formed with a circular aperture 156 which, in the mounted position of said plate, registers with a circular opening 158 in the cage rack rear wall 24. An annular rubber grommet 160 is mounted in the aligned circular openings 156 and 158, and a water dispensing valve 86 extends through the central opening of grommet 160 and makes sealing contact therewith, as shown in FIG. 5.

In the mounted position of guide bracket 144, the four locator holes register with a group of four corresponding threaded apertures in the rear wall 24 of the cage rack, and the bracket 144 is secured to said rear wall by screws 162. Spaced groups of four such threaded apertures are tapped in the animal cage rear wall along each shelf compartment in equally spaced relation at those positions in which cages are to be inserted.

Upstanding from the floor of each shelf compartment 32 is an elongated metal stop bar 164 which extends the length of the compartment. Each stop bar 164 terminates at each end in depending legs 166, as shown in FIG. 4, the legs being secured to the partition wall 34 constituting the floor of the shelf compartment, and positioning the stop bar 164 parallel to and spaced a short distance above the floor or partition wall 34.

When an animal cage 72 is to be inserted into one of the shelf compartments of the cage rack, the compartment door 26 is opened and the cage is brought forward into the compartment and placed between the bars 148 and 150 of a guide bracket 144 in a slightly elevated position. The cage is moved forward between the bars 148, 150 until it engages and is stopped by the cross-bar 152 and is then lowered to its mounted position in which it rests upon the floor of the shelf compartment into which it has been inserted. In this mounted position, the guide arms bracket the sides of the cage and are so spaced from each other that they abut the upper portion of the tapered side walls 78 of the cage, as shown in FIG. 4, thereby accurately positioning the cage in its proper location in the rack and preventing any transverse movement thereof. The cross-bar 152 abuts the rear wall 76 of the inserted cage, thereby accurately spacing said rear wall and its water access aperture the proper distance from the adjacent water dispensing valve 86, and also preventing forward movement of the cage. The stop bar 164 engages the front wall 74 of the inserted cage, so that it cannot slide outwardly of the shelf compartment during movement of the cage rack. The stop bar 164 also serves as an additional guide for proper placement of the cage relative to the water dispensing valve.

To insure that the inserted animal cage is properly positioned within its shelf compartment, each guide bracket 144 is made with a high degree of precision, with close tolerances. The locator holes 154 are precisely spaced from the circular valve aperture 156, and the guide rods 148, 150 are precisely mounted relative to said valve aperture, in order to insure that, when said guide bracket is installed in the rack, it will receive and hold an animal cage in exactly the proper location, that is with its water access aperture 130 in perfect registry with the mouth of the water dispensing valve 86 which is accurately mounted within the bracket valve opening 156. The cross bar 152 is also precisely mounted across the guide rods 148, 150 in a position to insure that the water access aperture 130 of the inserted cage is located at an exact spacing from the tip of the valve rod 108 so that it can be contacted by the tongue of the animal within the cage.

Figure 8:
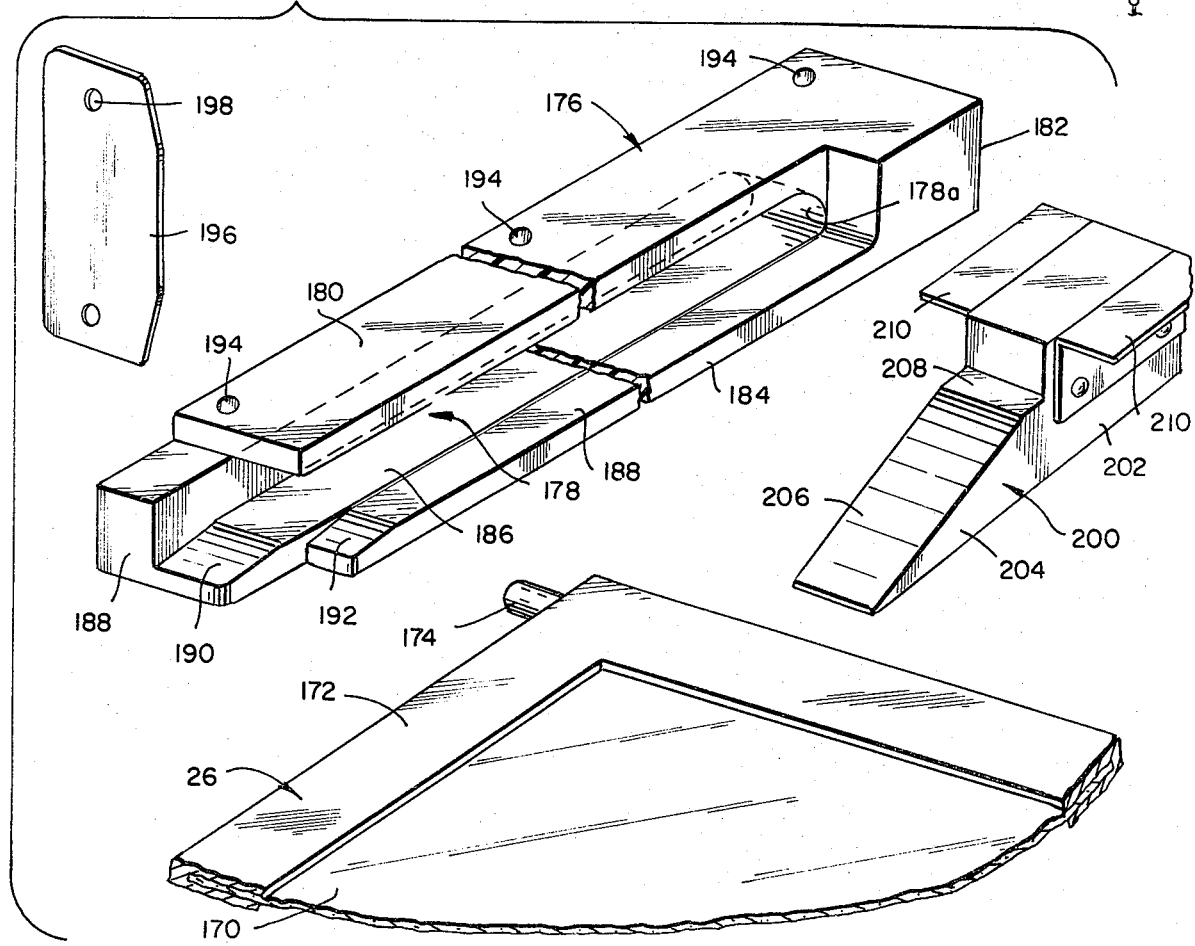
FIG. 8 is an exploded view of a corner of one of the sliding doors and the guide elements which support it in its opening and closing movements.

The transparent doors 26 are a part of a door system which enables the doors to be individually opened and slid to a retracted position, thereby providing ready access to the cages in individual shelf compartments. Each door 26 comprises a plate 170 of clear tempered glass bordered by a flat frame 172 of extruded aluminum. Each frame 172 is rectangular, and, as shown in FIG. 1, each door is sized to cover over and seal off the front of two adjacent shelf compartments 32, although this arrangement is optional and a separate door may be provided for each shelf compartment if desired or required. Each door is hinged to the cage rack housing by an individual tracking system, about to be described, and for this purpose, each door is provided at each of its opposite top corners with a cylindrical pivot pin 174, as shown in FIG. 8.

The door tracking system includes, for each door 26, a pair of elongated door glide tracks 176 made of a high-impact smooth plastic such as Delrin. One of these glide tracks 176 is shown in FIG. 8, the other of the pair being a mirror image thereof, and of identical construction. A pair of glide tracks is mounted at the upper end of the uppermost of the two shelf compartments to be covered by the door supported by the pair of glide tracks, in the manner indicated in FIG. 3. One guide track 176 of the pair is mounted on the cage rack side wall 20 and the other guide track is mounted on the opposite side wall 22.

Each guide track 176 has an elongated rectangular body having a linear groove or slot 178 formed therein and extending longitudinally for substantially the entire length of the guide track body. The groove 178 opens through the side of the guide track facing the interior of the shelf compartment, and also opens at the front of the guide track. The groove 178 defines in the guide track body a top wall 180, a rear wall 182 and a bottom wall 184. The top wall 180 is cut to have an appreciably lesser width than the bottom wall 184 to provide an inner track surface 186 between the bottom wall 184 and the overhanging top wall 180, and an outer track surface 188 which is exposed since it projects inwardly of the cage rack interior from the free edge of the top wall 180. The inner track surface 186 terminates at the front edge 189 of the guide track body 176, and at this front terminal edge is formed with an inclined ramp surface 190. The outer track surface 188 is cut shorter than the inner track surface, as shown in FIG. 8, and its front end is also provided with an inclined ramp surface 192. Each guide track body 176 is provided with screw-receiving holes 194 for attachment of the body to a metal support bracket (not shown) mounted on the respective side wall of the cage rack housing.

When the door 26 is assembled between the opposed pair of guide tracks 176, the door pivot pins 174 project into the grooves 178 of the respective guide tracks, with each pin 174 overlying and resting slidably upon the inner track surface 186. At the same time, the adjacent side panel of the aluminum door frame 172 rests in flat condition slidably upon the outer track surface 188.

To gain access to the interior of a shelf compartment and its contained animal cages, its door 26 is pivoted upwardly to a horizontal position and is then pushed rearwardly, the pivot pins 174 sliding through the grooves 178 of the opposed pair of glide tracks 176 until they engage the rounded rear ends 178a of said grooves. At this point, the door 26 is in its fully retracted position, substantially the entire length of the door frame side panels resting upon the outer track surfaces 188. The door 26 is thus recessed at the top of the upper shelf compartment 32, with only the front panel of the door frame 172 projecting from the front of the cage rack.

In order to close the retracted door, the door 26 is slid horizontally in an outward direction, the pins 174 sliding forwardly on the inner track surface 186 of the grooves 178 and the side panels of the door frame 172 sliding forwardly on the outer track surface 188. As each pin 174 reaches the front end of the respective inner track surface 186, it rides down the inclined ramp 190 into engagement with a rectangular metal retainer plate 196 (FIG. 8) which is mounted on the adjacent cage rack housing front wall portion by means of screw holes 198, in a position to cover over the front end of ramp 190 and prevent the pin 174 from leaving the glide track 176. Simultaneously, the rear corner of the door frame 172 also rides down the ramp 192. In the fully extended position of the door, the pivot pins 174 are in engagement with the retainer plates 196 at both sides of the cage rack housing, and the rear corners of the door frame 172 have cleared the ramp 192, and are free to turn downwardly. The door 26 is then pivoted downwardly about pivot pins 174 to its closed position in which it depends vertically from said pivot pins and closes off the front of the shelf compartments with which it is associated.

The ramps 190 and 192 provide a smooth door movement during the opening and closing operations. When a door is raised from its closed position to a horizontal position, the pivot pins 174 are at the lower end of the ramps 190 and when the horizontal door is pushed inwardly, the pins ride up the ramps to elevate the door slightly and enable its frame corners to engage the lower end of the ramp 192 in an unobstructed manner, without jamming. On the other hand, when the retracted door is pulled horizontally outwardly, at the end of its outward travel the pins 174 and the frame corners both ride smoothly down the respective ramps 190 and 192, lowering the extended, horizontal door slightly, and commencing the downward pivoting movement thereof smoothly and without bumping.

Each door 20 is also provided with a center support member 200 which underlies the center of the door in the retracted position of the latter and prevents the door frame from bowing and warping. The support member 200 comprises a rectangular body portion 202 having an integral nose portion 204 formed with an inclined ramp surface 206 which terminates in a shoulder 208. The body portion 202 is secured in depending condition from the ceiling of the shelf compartment in which the door is mounted by a pair of brackets 210. In its mounted position, the support member 200 is located at the center of the shelf compartment with its nose portion 204 projecting forwardly and in a position to engage and support the door.

When the door 26 is to be retracted and is pivoted to a horizontal position and slide rearwardly, the center portion of the door frame engages the support member nose portion and rides up the ramp surface 206. When the door reaches its fully-retracted position, the center of the door frame rests upon the shoulder 208 which is located on the same horizontal plane as the outer track surfaces 188 of the guide tracks 176, and therefore maintains the door frame in a supported flat condition on a horizontal plane.

Each door 26 is also provided with a pair of handles 212 which may be grasped for the opening and closing of the door. Each door may be locked in its closed position by a pair of captive locking screw 214 located adjacent to the bottom corners of the door frame 172 as shown in FIG. 1. Each locking screw 214 is rotatably mounted in the door frame 172, and in the closed position of the door, is located to engage a threaded hole (not shown) in the interior of the cage housing. The screw 214 has an enlarged knurled head so that it can be manually rotated for locking and unlocking the door. Thus, each of the doors may be locked to prevent accidental opening, and may be unlocked without special tools by a simple twist of the screws 214 to provide access to the interior of the cage rack.

While a preferred embodiment of the invention has been shown and described herein, it is obvious that numerous omissions, changes and additions may be made in such embodiment without departing from the spirit and scope of the invention.

What is claimed is:

1. A ventilated animal cage rack comprising:

an open-front housing having spaced transverse partition walls extending the width thereof and dividing said housing into a plurality of horizontally-disposed shelf compartments, each compartment having a solid, imperforate ceiling and a solid, imperforate floor and being sized to house a plurality of animal cages having imperforate side and bottom walls and open tops, a plurality of retractable transparent doors closing off the front open end of said housing and cooperating with said partition walls to seal off and isolate the interiors of said shelf compartments from one another, means mounting each of said doors on said housing for individual movement between a closed position covering over at least one of said shelf compartments and an open position providing access to said shelf compartments, a low pressure plenum extending vertically along one side of said housing in communication with an air exhaust system exteriorly of said housing.

each shelf compartment having an air outlet opening at one end communicating with said plenum, and an air inlet opening at the opposite end opening exteriorly of said cage rack, whereby air is drawn from the atmosphere surrounding said cage rack through the inlet opening of each shelf compartment and passes horizontally in a laminar low-velocity flow through said shelf compartment to said outlet opening and into said plenum, means for removably mounting a plurality of said animal cages in a transverse row along each of said shelf compartments with the open tops of said cages spaced an appreciable distance below the ceiling of said shelf compartment, the inlet and outlet openings of each shelf compartment being positioned to direct said air flow across the top open ends of the row of cages mounted in said shelf compartment, thereby ventilating each shelf compartment individually and isolating the shelf compartments from the exterior of said cage rack.

2. A ventilated animal cage rack according to claim 1 in which said air exhaust system include suction means connected to said plenum for providing a low pressure condition in said plenum, and conduit means connecting said suction means to an exhaust from the room in which said cage rack is located.

3. A ventilated animal cage rack according to claim 1 in which said cage rack is portable and said housing is mounted on wheels.

4. A ventilated animal cage rack according to claim 1 in which the air outlet opening of each shelf compartment has manually adjustable closure means for varying the size of said outlet opening and thereby varying the intensity of the air flow through said shelf compartment.

5. A ventilated animal cage rack according to claim 4 in which said closure means comprises a gate slidably mounted in said cage rack housing in alignment with a respective outlet opening and movable between an open position in which said outlet opening is uncovered, and a closed position in which said outlet opening is substantially covered, and means for selectively locking said gate in any adjusted position between said open and closed positions.

6. A ventilated animal cage rack according to claim 5 in which said closure means includes stop means for halting closing movement of said gate at a point in which said outlet opening is partially uncovered when said gate is in its closed position.

7. A ventilated animal cage rack according to claim 1 in which each door comprises a transparent panel bordered by a metal frame and a pivot pin projecting laterally from each side of said frame at the upper end thereof, and a pair of slide tracks for each door mounted on the respective side walls of said housing at the upper end of a shelf compartment to be covered by said door, each slide track having an elongated longitudinal slot receiving one of said pins, said pins being rotatable in said slots, whereby said door may be pivoted upwardly from its closed position to an extended horizontal position in which said door projects perpendicularly outward from the front of said housing and said door is aligned with the plane of said slide tracks, said pins being also slidable in said slots, whereby the extended door may be pushed inwardly to a retracted position within said housing, with said pins sliding to the rear of said slots.

8. A ventilated animal cage rack according to claim 7 in which each slot has a bottom surface defining an inner track surface and said slide track has a bottom surface defining an outer track surface extending along the inner edge of said inner track surface, said pin resting upon said inner track surface, and the side portion of said frame resting upon said outer track surface in the retracted position of said door.

9. A ventilated animal cage rack according to claim 8 in which the forward end of each inner track surface and each outer track surface terminates in a downwardly-inclined ramp.

10. A ventilated animal cage rack according to claim 7 in which a central support member is provided for each door, each support member comprising a body portion mounted at the center of the roof of a shelf compartment and depending therefrom, a nose portion projecting forwardly from said body portion and having a forwardly and downwardly inclined top ramp surface, and a shoulder between said ramp surface and said body portion.

11. A ventilated animal cage rack according to claim 1 in which said animal cage mounting means includes a guide bracket for each of said cages, each guide bracket comprising a flat plate secured to the rear wall of said housing within a shelf compartment, a pair of spaced guide arms secured to said plate and projecting forwardly therefrom, and a cross bar interconnecting said guide arms, said guide arms being spaced to engage the side walls of an animal cage inserted therebetween to restrain lateral movement of said inserted cage, said cross bar being positioned to engage the rear wall of the inserted cage to restrain further movement thereof inwardly of said shelf compartment.

12. A ventilated animal cage rack comprising:
an open-front housing having spaced transverse partition walls extending the width thereof and dividing said housing into a plurality of horizontally-disposed shelf compartments, each compartment having a ceiling and a floor and being sized to house a plurality of animal cages having open tops,
a plurality of transparent doors closing off the front open end of said housing and isolating the interiors of said shelf compartments from one another,
means mounting each of said doors on said housing for individual movement between a closed position covring over at least one of said shelf compartments and an open position providing access to said shelf compartments,
a low pressure plenum extending vertically along one side of said housing in communication with an air exhaust system exteriorly of said housing,
each shelf compartment having an air outlet opening at one end communicating with said plenum, and an air inlet opening at the opposite end opening exteriorly of said cage rack, whereby air is drawn from the atmosphere surrounding said cage rack through the inlet opening of each shelf compartment and passes in a laminar low-velocity flow through said shelf compartment to said outlet opening and into said plenum,
means for removably mounting a plurality of said animal cages in a transverse row along each of said shelf compartments with the open tops of said cages spaced an appreciable distance below the ceiling of said shelf compartment,
said mounting means including a guide bracket for each of said cages, each guide bracket comprising a flat plate secured to the rear wall of said housing within a shelf compartment, a pair of spaced guide arms secured to said plate and projecting forwardly therefrom, and a cross bar interconnecting said guide arms, said guide arms being spaced to engage the side walls of an animal cage inserted therebetween to restrain lateral movement of said inserted cage, said cross bar being positioned to engage the rear wall of the inserted cage to restrain further movement thereof inwardly of said shelf compartment,
said mounting means also including a stop bar mounted on the floor of said shelf compartment forwardly of said guide bracket, said stop bar extending parallel to said bracket cross bar and being positioned to engage the front wall of the inserted animal cage to prevent movement thereof outwardly of said shelf compartment,
the inlet and outlet openings of each shelf compartment being positioned to direct said air flow across the top open ends of the row of cages mounted in said shelf compartment, thereby ventilating each shelf compartment individually and isolating the shelf compartments from the exterior of said cage rack.

13. A ventilated animal cage rack according to claim 12 which also includes automatic water dispensing means for supplying drinking water to the animals in each of the inserted cages, said water dispensing means comprising a water circulation manifold extending in serpentine manner along the rear wall of said housing and having horizontal sections aligned with each of the respective shelf compartments, each of said manifold horizontal sections having a plurality of dispensing valves spaced along the length thereof and communicating therewith, each of said dispensing valves projecting into the interior of said shelf compartment and being in alignment with an inserted animal cage.

14. A ventilated animal cage rack according to claim 13 in which each animal cage has an access aperture in the rear wall thereof, said access aperture being sized and positioned to permit an animal in the inserted cage to engage with its mouth the dispensing valve aligned with said cage.

15. A ventilated animal cage rack according to claim 14 in which each dispensing valve includes a nozzle portion and a valve-release rod having a tip projecting from the mouth of said nozzle portion, the guide arms of said guide bracket being positioned to align the center of the access aperture of the inserted animal cage with the nozzle portion of the adjacent dispensing valve, and the cross bar of said guide bracket being located to position the rear wall of the inserted cage spaced at such a distance from the mouth of said nozzle portion that an animal in said cage may extend its snout through the cage access aperture and engage the tip of the valve release rod with its tongue.

16. A ventilated animal cage rack according to claim 15 in which the plate of said guide bracket has a plurality of mounting holes and an enlarged aperture therein, said mounting holes being adapted to receive fastening members therethrough for securing said plate to the rear wall of said housing with a dispensing valve extending centrally through said enlarged aperture, said mounting holes, enlarged aperture and said guide arms being precisely positioned on said plate with relation to each other, such that said animal cage in its inserted position is accurately located with its access aperture in precise registry with the nozzle mouth of the adjacent dispensing valve.

17. A ventilated animal cage rack according to claim 16 in which said guide brackets are mounted in an aligned horizontal row of equally-spaced brackets within each shelf compartment, whereby the animal cages inserted in said brackets are held in an equally spaced horizontal row along the length of the respective shelf compartment.

18. A ventilated animal cage rack according to claim 15 in which an elongated trough is mounted on the floor of each of said shelf compartments, each trough extending the extent of said shelf compartment and underlying the water valve nozzles located therein to receive excess water dripping from said nozzles, each of said troughs communicating with a water inlet opening in one side of said cage rack housing and having a portion extending therethrough.

19. A ventilated animal cage rack according to claim 18 in which a beaded chain is mounted on the exterior of said housing at the top thereof, said beaded chain hanging vertically along one side of said housing and engaging each of the trough portions extending therefrom.

* * * * *